US009612111B2

(12) United States Patent
Koresko (10) Patent No.: US 9,612,111 B2
(45) Date of Patent: Apr. 4, 2017

(54) INTEGRATED OPTICAL BORESIGHTING TARGET (71) Applicant: THE BOEING COMPANY, Chicago, IL (US)

(72) Inventor: Christopher D. Koresko, Chicago, IL (US)

(73) Assignee: THE BOEING COMPANY, Chicago, IL (US)

(*) Notice: Subject to any disclaimer, the term of this patent is extended or adjusted under 35 U.S.C. 154(b) by 14 days.

(21) Appl. No.: 14/841,549

(22) Filed: Aug. 31, 2015

(65) Prior Publication Data
US 2017/0059309 A1  Mar. 2, 2017

(51) Int. Cl.
G01B 11/00 (2006.01)
G01B 11/27 (2006.01)
(52) U.S. Cl.
CPC .................. G01B 11/272 (2013.01)
(58) Field of Classification Search
CPC .. F41G 3/00; F41G 1/00; G01B 11/00; G02B 23/00; G02B 26/00; F41H 13/00
USPC ............. 356/400, 445–446, 371, 141, 152
See application file for complete search history.

(56) References Cited

U.S. PATENT DOCUMENTS

| 4,422,758 A * | 12/1983 | Godfrey ............... F41G 3/326 250/341.6 |
| 4,569,591 A * | 2/1986 | Ford ..................... G01S 7/4811 356/153 |
| 5,025,149 A * | 6/1991 | Hatfield, Jr. .......... G02B 23/12 250/342 |
| 5,054,917 A * | 10/1991 | Pepin ..................... F41G 3/326 250/203.2 |
| 5,506,675 A | 4/1996 | Lopez et al. |

(Continued)

FOREIGN PATENT DOCUMENTS

EP  2680030 A1  1/2014
FR  2877098 A1  4/2006

OTHER PUBLICATIONS

The extended European Search Report for European Application No. 16184277.8-1812, dated Feb. 21, 2017 (10pages).

Primary Examiner — Tarifur Chowdhury
Assistant Examiner — Isiaka Akanbi
(74) Attorney, Agent, or Firm — Vista IP Law Group LLP; Cynthia A. Dixon (57) ABSTRACT In some embodiments, the method for boresighting a system under test (SUT) involves radiating, by the SUT, an illuminating signal(s) to a target, where the illuminating signal(s) is radiated onto an external screen of the target. The method further involves detecting, by an external detector(s), the illuminating signal(s) radiated onto the external screen to produce an external detector measurement. Also, the method involves aligning the SUT by using the external detector measurement. In addition, the method involves radiating, by the SUT, the illuminating signal(s) to the target, where the illuminating signal(s) is radiated through an opening located on a side of the target and onto an internal screen of the target. Additionally, the method involves detecting, by an internal detector(s) of the target, the illuminating signal(s) radiated onto the internal screen to produce an internal detector measurement. Further, the method involves aligning the SUT by using the internal detector measurement.

20 Claims, 5 Drawing Sheets (56) References Cited

U.S. PATENT DOCUMENTS

| | | | | |
|---|---|---|---|---|
| 5,680,215 | A * | 10/1997 | Huber | G01B 11/306 356/237.1 |
| 5,825,495 | A * | 10/1998 | Huber | G01B 11/306 348/131 |
| 6,204,961 | B1 * | 3/2001 | Anderson | F41G 3/065 359/353 |
| 6,211,951 | B1 * | 4/2001 | Guch, Jr. | F41G 3/326 356/141.3 |
| 7,184,136 | B2 * | 2/2007 | McHugh | F41G 1/54 356/138 |
| 8,400,625 | B1 | 3/2013 | Young et al. | |
| 2003/0174315 | A1 * | 9/2003 | Byren | G01B 11/26 356/152.1 |

\* cited by examiner

INTEGRATED OPTICAL BORESIGHTING TARGET

FIELD

The present disclosure relates to a boresighting target. In particular, it relates to an integrated optical boresighting target (IOBT).

BACKGROUND

Most optical targets are designed to work at a single wavelength or over a limited range of wavelengths (e.g., visible light), and are typically either light sources or light detectors, but not both. This makes it awkward to use them for boresighting (i.e. aligning) and calibrating modern optical sensor systems (e.g., a system under test (SUT)), which may fuse data from detectors working at multiple wavelength regions (e.g., visible, near infra-red, and thermal infra-red) and which may also include light sources (e.g., lasers). Such a sensor system typically consists of subassemblies, which must be precisely co-aligned so that for example, a laser beam emerges parallel to the field of the photodetector.

A typical solution might be an arrangement, which allows for several optical targets with various emission and detection capabilities to be inserted at the focus of an optical system where they can be viewed or illuminated by the SUT. Such an arrangement demands precise and repeatable mechanical insertions to be made. This is potentially a time-consuming and error-prone process, and it carries a risk of accidentally bumping and misaligning or damaging the optical system, thereby potentially causing laser beams from the SUT to pose a safety hazard.

As such, there is need for an improved technique for boresighting a SUT.

SUMMARY

The present disclosure relates to a method, system, and apparatus for an integrated optical boresighting target (IOBT). In one or more embodiments, a method for boresighting a system under test (SUT) involves radiating, by the SUT, at least one illuminating signal to a target, where at least one illuminating signal is radiated onto an external screen of the target. The method further involves detecting, by at least one external detector, at least one illuminating signal radiated onto the external screen to produce an external detector measurement. Also, the method involves aligning the SUT by using the external detector measurement. In addition, the method involves radiating, by the SUT, at least one illuminating signal to the target, where at least one illuminating signal is radiated through an opening located on a side of the target and onto an internal screen of the target. Additionally, the method involves detecting, by at least one internal detector of the target, at least one illuminating signal radiated onto the internal screen to produce an internal detector measurement. Further, the method involves aligning the SUT by using the internal detector measurement.

In one or more embodiments, the method further involves ceasing, by the SUT, the radiating of at least one illuminating signal to the target. Further, the method involves applying a signal source to the internal screen of the target. Also, the method involves radiating, by an internal screen of the target, at least one emanating signal towards the SUT, where at least one emanating signal is radiated through the opening located on the side of the target and onto the SUT. In addition, the method involves detecting, by at least one subsystem of the SUT, at least one emanating signal to produce a SUT detector measurement. Further, the method involves aligning at least one subsystem of the SUT by using the SUT detector measurement.

In at least one embodiment, the external screen is an infra-red (IR) visualizer or a phosphor screen. In some embodiments, the internal screen is an IR visualizer or a phosphor screen. In one or more embodiments, the method further involves measuring, by at least one temperature sensor, a temperature of the internal screen. In some embodiments, the signal source is heating, with at least one heating unit, the internal screen; cooling, with at least one cooling unit, the internal screen; or illuminating, by an internal light source, the internal screen with light.

In one or more embodiments, at least one internal detector comprises at least one photodiode, phototransistor, and/or photocell. In some embodiments, when at least one internal detector comprises at least one photodiode, at least one photodiode comprises silicon, ultra-violet (UV) enhanced silicon, InGaAs near infra-red (NIR), InGaAs far infra-red (FIR), and/or a combination thereof. In one or more embodiments, when at least one internal detector comprises at least one photodiode, at least one photodiode comprises at least one bandpass filter.

In at least one embodiment, the SUT comprises at least one light emitting diode (LED), laser, hot filament, and/or light-emitting device. In some embodiments, the opening located on the side of the target is a pinhole. In at least one embodiment, the target comprises a housing, and the internal screen is located inside of the housing.

In one or more embodiments, a system for a boresighting a system under test (SUT) involves the SUT to radiate at least one illuminating signal to a target, where at least one illuminating signal is radiated onto an external screen of the target. The system further involves at least one external detector to detect at least one illuminating signal radiated onto the external screen to produce an external detector measurement. Also, the system involves the SUT further to be aligned by using the external detector measurement, and to radiate at least one illuminating signal to the target, where at least one illuminating signal is radiated through an opening located on a side of the target and onto an internal screen of the target. In addition, the system involves at least one internal detector of the target to detect at least one illuminating signal radiated onto the internal screen to produce an internal detector measurement. Further, the system involves the SUT further to be aligned by using the internal detector measurement.

In at least one embodiment, the system further involves the SUT to cease the radiating of at least one illuminating signal to the target. The system further involves a signal source to be applied to the internal screen of the target. Also, the system involves the internal screen of the target to radiate at least one emanating signal towards the SUT, where at least one emanating signal is radiated through the opening located on the side of the target and onto the SUT. Further, the system involves at least one subsystem of the SUT to detect at least one emanating signal to produce a SUT detector measurement, and to be aligned by using the SUT detector measurement.

In one or more embodiments, the system further involves at least one temperature sensor to measure a temperature of the internal screen. In at least one embodiment, the signal source is at least heating unit to heat the internal screen, at least one cooling unit to cool the internal screen, or an internal light source to illuminate the internal screen with light.

In at least one embodiment, a method for an integrated optical boresighting target (IOBT) involves receiving, by the target, at least one illuminating signal radiated from a system under test (SUT), where at least one illuminating signal is radiated onto an external screen of the target. The method further involves receiving, by the target, at least one illuminating signal radiated from the SUT, where at least one illuminating signal is radiated through an opening located on a side of the target and onto an internal screen of the target. Also, the method involves detecting, by at least one internal detector of the target, at least one illuminating signal radiated onto the internal screen to produce an internal detector measurement. In addition, the method involves applying a signal source to the internal screen of the target. Further, the method involves radiating, by an internal screen of the target, at least one emanating signal towards the SUT, where at least one emanating signal is radiated through the opening located on the side of the target and onto the SUT.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for an integrated optical boresighting target (IOBT) (also referred to as a target). The system of the present disclosure teaches an IOBT that provides an optical target for the boresighting (i.e. aligning) of a sensor (e.g. a system under test (SUT)), which transmits and/or receives light at ultraviolet (UV) through thermal infra-red (IR) wavelengths. The target can both emit from, and detect light reaching, a small pinhole aperture of the target. The pinhole thus serves as a datum (i.e. a reference point) for multiple emitters and/or detectors.

As previously mentioned above, most optical targets work at a single wavelength, and as either a light source or a light detector. The IOBT of the present disclosure can cover a broad range of wavelengths, and can work as both a light source and a light detector.

The disclosed IOBT combines a set of light emitters, such as lasers, light emitting diodes (LEDs), hot-filament light bulbs, and hot plates, with one or more light detectors (e.g., photodiodes), and potentially wavelength conversion optical materials (e.g., phosphor screens or infra-red (IR) visualizers) with a diffusely reflecting screen and pinhole aperture. The emitters and detectors are arranged to illuminate or observe, respectively, an area of the screen behind the pinhole. The pinhole becomes the boresight datum: by activating one of the emitters, it is made to appear to the system under test (SUT) as a point source of light at a specific wavelength. Conversely, light coming from the SUT and entering the pinhole is diffusely scattered and potentially wavelength converted by the internal screen, and detected by an internal detector. No mechanical changes are required for the IOBT to switch between wavelengths or emitter/detector roles. Moreover, the design provides adjustable and potentially large attenuation via choosing the distance between an emitter or detector and the diffuse screen, thereby making it convenient to tailor the brightness and sensitivity of the IOBT to those of the SUT.

It should be noted that locating the IOBT at the focus makes it unnecessary to perform mechanical insertion and removal of optical targets to change wavelengths or to switch between emitters and detectors. Instead, the technician simply activates the appropriate device (emitter or detector) within the IOBT. This can be done via either a collection of manual switches on control panels, or under automatic control. The time and risk associated with removing one target and precisely inserting another are eliminated and, as such, repeatability becomes nearly perfect.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to boresighting, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1A:
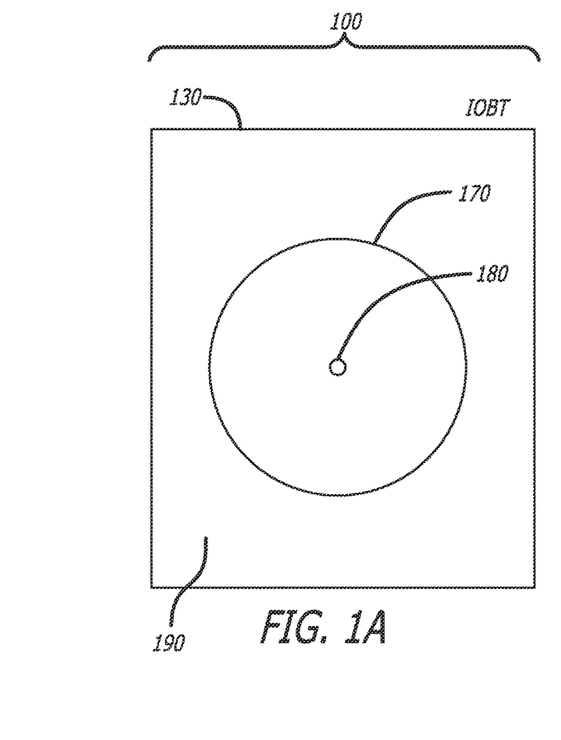
FIGS. 1A and 1B are diagrams depicting the disclosed system for boresighting a system under test (SUT), where the integrated optical boresighting target (IOBT) employs a phosphor screen for its internal screen and external screen, in accordance with at least one embodiment of the present disclosure.
Figure 1B:
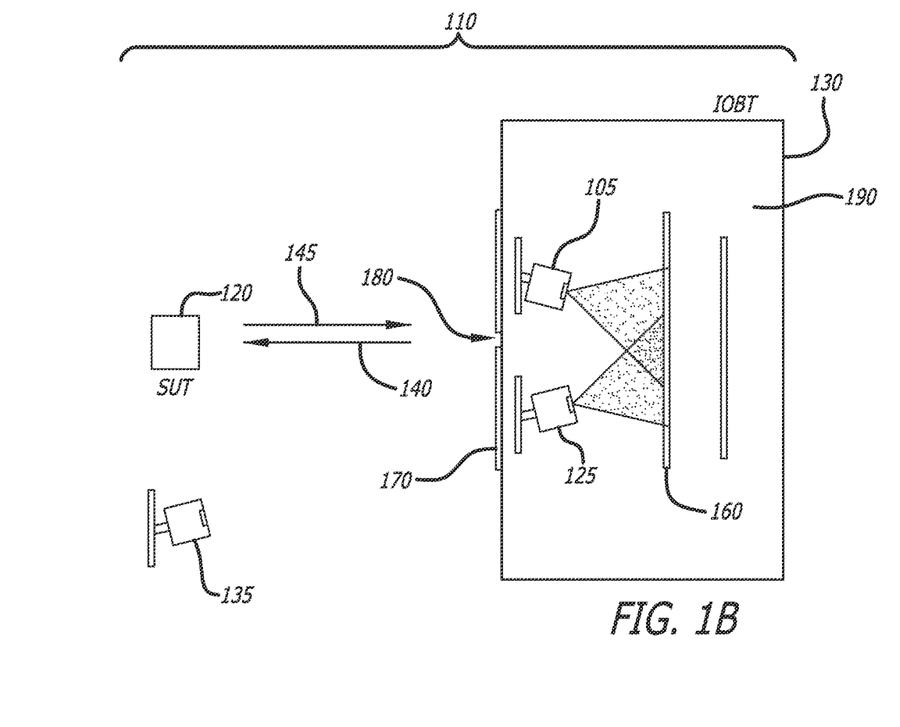

FIGS. 1A and 1B are diagrams 100, 110 depicting the disclosed system for boresighting a system under test (SUT) 120, where the integrated optical boresighting target (IOBT) 130 employs a phosphor screen for its internal screen 160 and external screen 170, in accordance with at least one embodiment of the present disclosure. In particular, FIG. 1A is a diagram 100 of the front view of the IOBT 130, and FIG. 1B is a diagram 110 of the open side view of the IOBT 130 also showing the SUT 120.

In FIG. 1A, the front view of the IOBT 130 shows the IOBT 130 to include an external screen 170, which for this embodiment is a phosphor screen. A phosphor screen is employed to absorb ultraviolet (UV) light and, in response, emit visible light. The external screen 170 is shown to include a pinhole (i.e. an opening on the side of the IOBT 130) 180. In addition, the IOBT 130 is shown to include an external housing 190.

In FIG. 1B, during operation of the IOBT 130, for this embodiment, the SUT 120 radiates at least one illuminating signal 145 to the external screen 170 of the IOBT 130. An external detector 135 detects the illuminating signal(s) 145 radiated onto the external screen 170 to produce an external detector measurement. The SUT 120 is aligned (e.g., by movement of the SUT 120 and/or by mirrors) by using the external detector measurement.

Also, during operation of the IOBT 130, the SUT 120 radiates at least one illuminating signal 145 to the IOBT 130. The illuminating signal(s) 145 is radiated through the pinhole 180 and onto the internal screen 160 of the IOBT 130. An internal detector 125 of the IOBT 130 detects the illuminating signal(s) 145 radiated onto the internal screen 160 to produce an internal detector measurement. The SUT 120 is further aligned (e.g., by movement of the SUT 120 and/or by mirrors) by using the internal detector measurement.

Then, during operation of the IOBT 130, the SUT 120 ceases radiating the illuminating signal(s) 145 to the IOBT 130. Then, an internal light source 105 radiates light onto the internal screen 160. The internal screen 160 radiates at least one emanating signal 140 towards the SUT 120. The emanating signal(s) 140 is radiated through the pinhole 180 and onto the SUT 120. At least one subsystem of the SUT 120 detects the emanating signal(s) 140 to produce a SUT detector measurement. At least one subsystem of the SUT 120 is aligned (e.g., by movement of the SUT 120 and/or by mirrors) by using the SUT detector measurement.

Figure 2A:
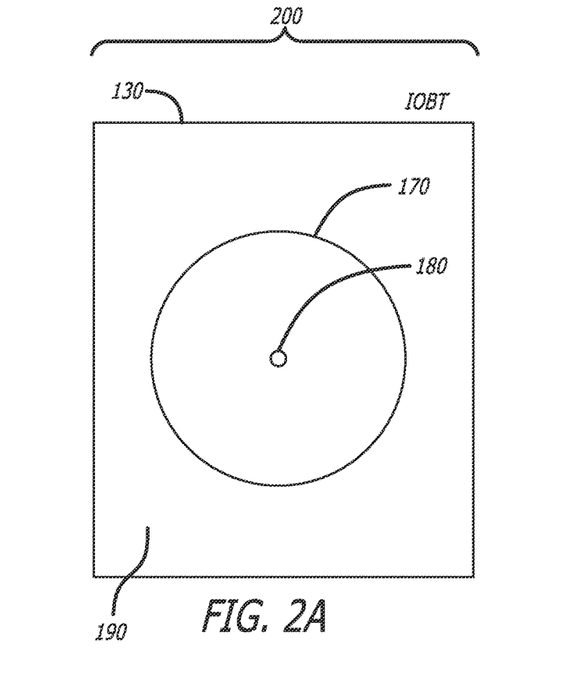
FIGS. 2A and 2B are diagrams depicting the disclosed system for boresighting a SUT, where a signal source is a heating unit heating the internal screen, in accordance with at least one embodiment of the present disclosure.
Figure 2B:
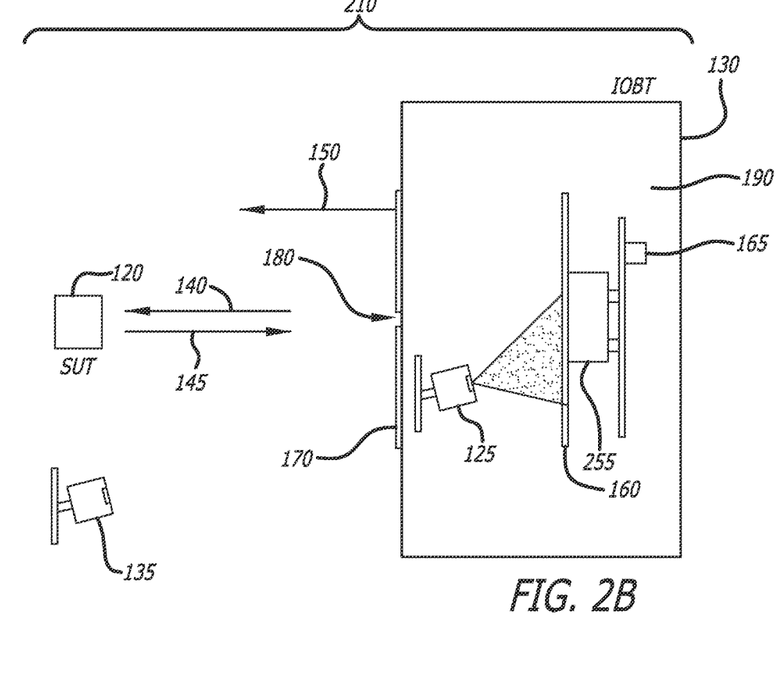

FIGS. 2A and 2B are diagrams 200, 210 depicting the disclosed system for boresighting a SUT 120, where a signal source is a heating unit 255 heating the internal screen 160, in accordance with at least one embodiment of the present disclosure. In particular, FIG. 2A is a diagram 200 of the front view of the IOBT 130, and FIG. 2B is a diagram 210 of the open side view of the IOBT 130 also showing the SUT 120.

In FIG. 2A, the front view of the IOBT 130 shows the IOBT 130 to include an external screen 170. In one or more embodiments, an IR visualizer is employed for the external screen 170. An IR visualizer is employed to absorb infra-red (IR) and, in response, emit visible light. It should be noted that in other embodiments, the different screens or materials may be employed for the external screen 170 instead of an IR visualizer. The external screen 170 is shown to include a pinhole (i.e. an opening on the side of the IOBT 130) 180. In addition, the IOBT 130 is shown to include an external housing 190.

In FIG. 2B, during operation of the IOBT 130, for this embodiment, the SUT 120 radiates at least one illuminating signal 145 to the external screen 170 of the IOBT 130. An external detector 135 detects the illuminating signal(s) 145 radiated onto the external screen 170 to produce an external detector measurement. The SUT 120 is aligned (e.g., by movement of the SUT 120 and/or by mirrors) by using the external detector measurement.

Also, during operation of the IOBT 130, the SUT 120 radiates at least one illuminating signal 145 to the IOBT 130. The illuminating signal(s) 145 is radiated through the pinhole 180 and onto the internal screen 160 of the IOBT 130. In one or more embodiments, an IR visualizer is employed for the internal screen 160. It should be noted that in other embodiments, the different screens or materials may be employed for the internal screen 160 instead of an IR visualizer.

An internal detector 125 of the IOBT 130 detects the illuminating signal(s) 145 radiated onto the internal screen 160 to produce an internal detector measurement. The SUT 120 is further aligned (e.g., by movement of the SUT 120 and/or by mirrors) by using the internal detector measurement.

Then, during operation of the IOBT 130, the SUT 120 ceases radiating the illuminating signal(s) 145 to the IOBT 130. Then, at least one temperature sensor 165 measures a temperature of the internal screen 160. Then, at least one heating unit (i.e. a heater) 255 heats the internal screen 160 by using the measured temperature. The internal screen 160 radiates at least one emanating signal 140 towards the SUT 120. The emanating signal(s) 140 is radiated through the pinhole 180 and onto the SUT 120. At least one subsystem of the SUT 120 detects the emanating signal(s) 140 to produce a SUT detector measurement. At least one subsystem of the SUT 120 is aligned (e.g., by movement of the SUT 120 and/or by mirrors) by using the SUT detector measurement.

Figure 3A:
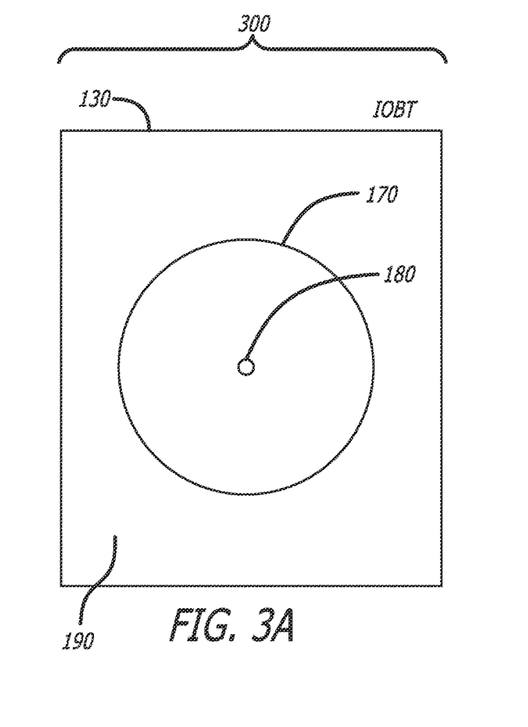
FIGS. 3A and 3B are diagrams depicting the disclosed system for boresighting a SUT, where a signal source is a cooling unit cooling the internal screen, in accordance with at least one embodiment of the present disclosure.
Figure 3B:
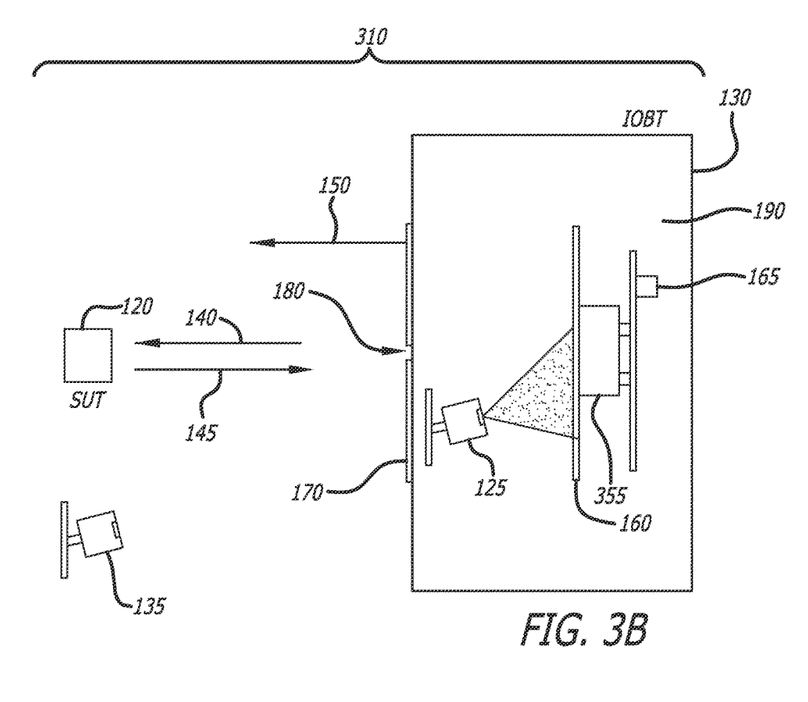

FIGS. 3A and 3B are diagrams 300, 310 depicting the disclosed system for boresighting a SUT 120, where a signal source is a cooling unit 355 cooling the internal screen 160, in accordance with at least one embodiment of the present disclosure. In particular, FIG. 3A is a diagram 300 of the front view of the IOBT 130, and FIG. 3B is a diagram 310 of the open side view of the IOBT 130 also showing the SUT 120.

In FIG. 3A, the front view of the IOBT 130 shows the IOBT 130 to include an external screen 170. In one or more embodiments, an IR visualizer is employed for the external screen 170. It should be noted that in other embodiments, the different screens or materials may be employed for the external screen 170 instead of an IR visualizer. The external screen 170 is shown to include a pinhole (i.e. an opening on the side of the IOBT 130) 180. In addition, the IOBT 130 is shown to include an external housing 190.

In FIG. 3B, during operation of the IOBT 130, for this embodiment, the SUT 120 radiates at least one illuminating signal 145 to the external screen 170 of the IOBT 130. An external detector 135 detects the illuminating signal(s) 145 radiated onto the external screen 170 to produce an external detector measurement. The SUT 120 is aligned (e.g., by movement of the SUT 120 and/or by mirrors) by using the external detector measurement.

Also, during operation of the IOBT 130, the SUT 120 radiates at least one illuminating signal 145 to the IOBT 130.

The illuminating signal(s) 145 is radiated through the pinhole 180 and onto the internal screen 160 of the IOBT 130. In one or more embodiments, an IR visualizer is employed for the internal screen 160. It should be noted that in other embodiments, the different screens or materials may be employed for the internal screen 160 instead of an IR visualizer.

An internal detector 125 of the IOBT 130 detects the illuminating signal(s) 145 radiated onto the internal screen 160 to produce an internal detector measurement. The SUT 120 is further aligned (e.g., by movement of the SUT 120 and/or by mirrors) by using the internal detector measurement.

Then, during operation of the IOBT 130, the SUT 120 ceases radiating the illuminating signal(s) 145 to the IOBT 130. Then, at least one temperature sensor 165 measures a temperature of the internal screen 160. Then, at least one cooling unit (i.e. a cooler) 355 cools the internal screen 160 by using the measured temperature. The internal screen 160 radiates at least one emanating signal 140 towards the SUT 120. The emanating signal(s) 140 is radiated through the pinhole 180 and onto the SUT 120. At least one subsystem of the SUT 120 detects the emanating signal(s) 140 to produce a SUT detector measurement. At least one subsystem of the SUT 120 is aligned (e.g., by movement of the SUT 120 and/or by mirrors) by using the SUT detector measurement.

Figure 4:
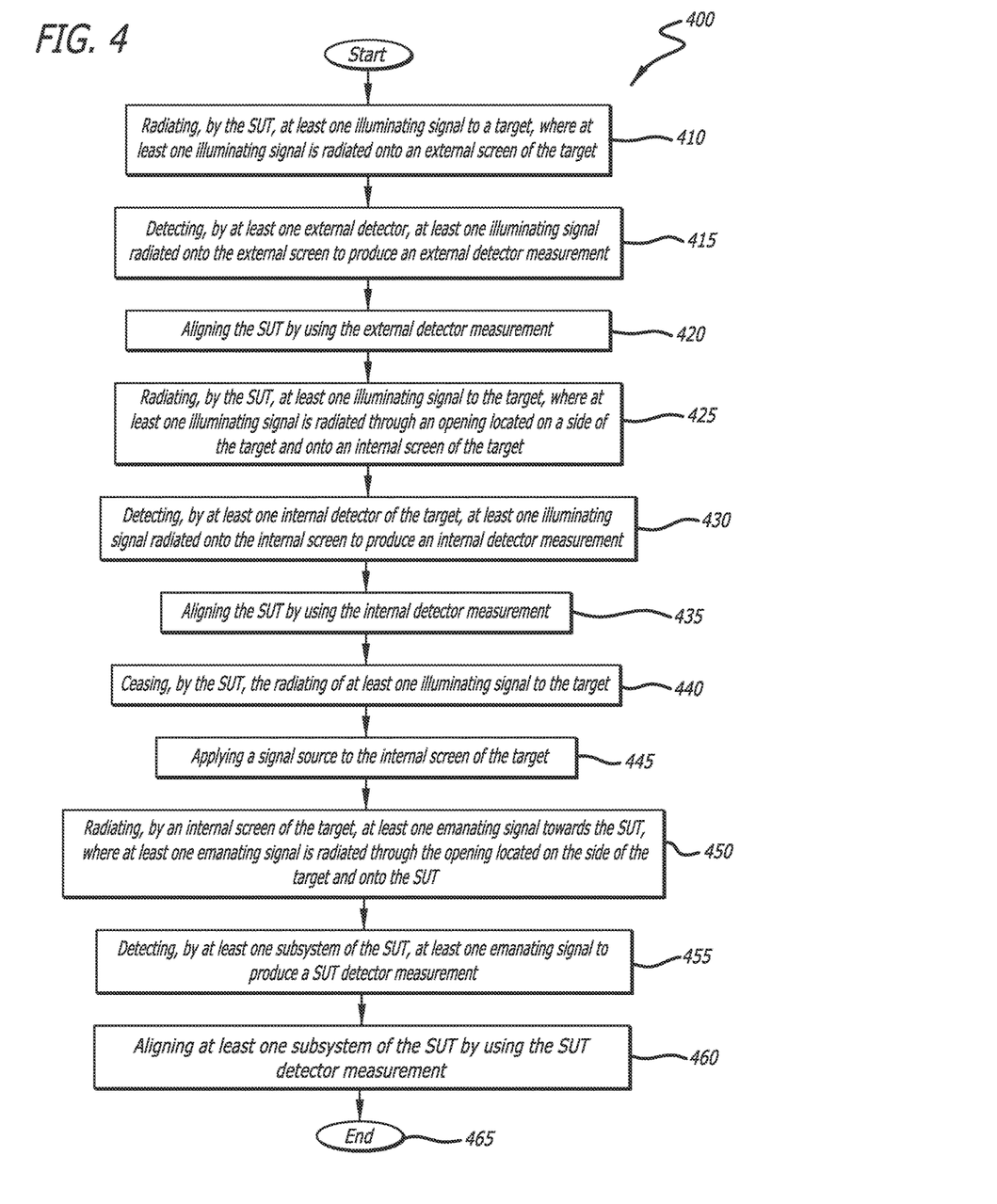
FIG. 4 is a flow chart depicting the disclosed method for boresighting a SUT, in accordance with at least one embodiment of the present disclosure.

FIG. 4 is a flow chart 400 depicting the disclosed method for boresighting a SUT, in accordance with at least one embodiment of the present disclosure. At the start 405 of the method, the SUT radiates at least one illuminating signal to a target, where at least one illuminating signal is radiated onto an external screen of the target 410. Then, at least one external detector detects at least one illuminating signal radiated onto the external screen to produce an external detector measurement 415. The SUT is aligned by using the external detector measurement 420.

The SUT radiates at least one illuminating signal to the target, where at least one illuminating signal is radiated through an opening located on a side of the target and onto an internal screen of the target 425. At least on internal detector of the target detects at least one illuminating signal radiated onto the internal screen to produce an internal detector measurement 430. The SUT is further aligned using the internal detector measurement 435.

Then, the SUT ceases radiating at least one illuminating signal to the target 440. A signal source (e.g., a heating unit heating the internal screen, a cooling unit cooling the internal screen, or an internal light source illuminating the internal screen) is then applied to the internal screen of the target 445. An internal screen of the target radiates at least one emanating signal towards the SUT, where at least one emanating signal is radiated through the opening located on the side of the target and onto the SUT 450. At least one subsystem of the SUT detects at least one emanating signal to produce a SUT detector measurement 455. At least one subsystem of the SUT is aligned by using the SUT detector measurement 460. Then, the method ends 465.

Figure 5:
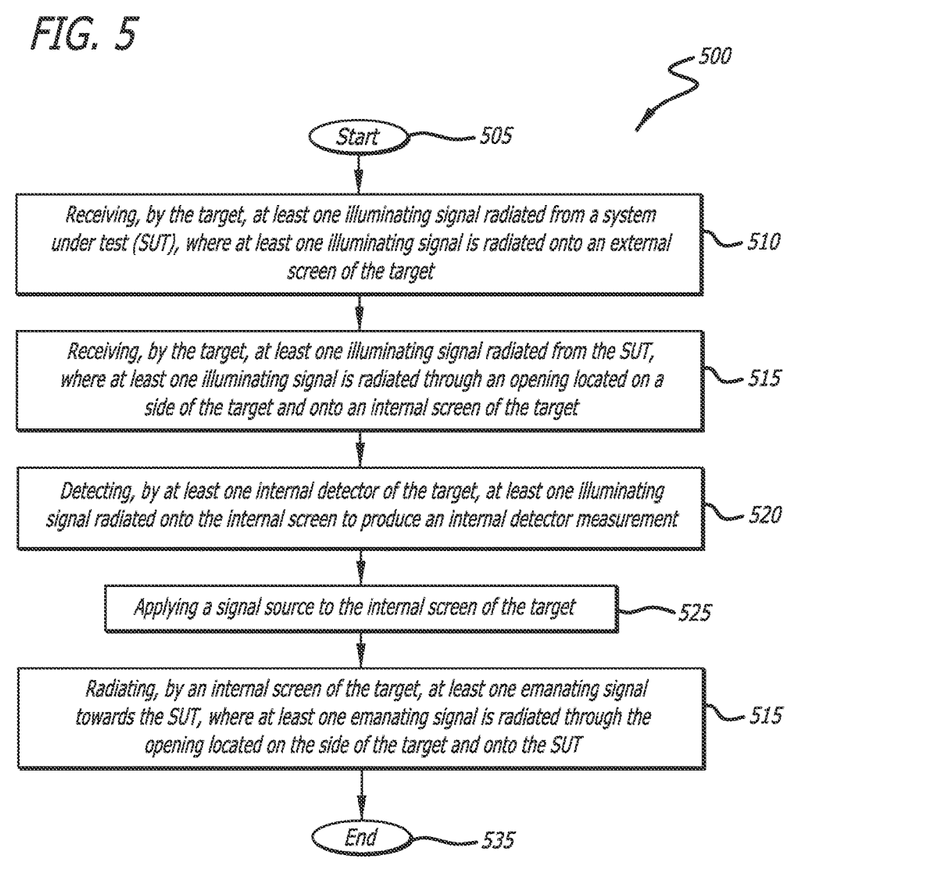
FIG. 5 is a flow chart depicting the disclosed method for an IOBT, in accordance with at least one embodiment of the present disclosure.

FIG. 5 is a flow chart 500 depicting the disclosed method for an IOBT, in accordance with at least one embodiment of the present disclosure. At the start 505 of the method, the target receives at least one illuminating signal radiated from a SUT, where at least one illuminating signal is radiated onto an external screen of the target 510. The target receives at least one illuminating signal radiated from the SUT, where at least one illuminating signal is radiated through an opening located on a side of the target and onto an internal screen of the target 515. At least one internal detector detects at least one illuminating signal radiated onto the internal screen to produce an internal detector measurement 520. A signal source (e.g., a heating unit heating the internal screen, a cooling unit cooling the internal screen, or an internal light source illuminating the internal screen) is applied to the internal screen of the target 525. The internal screen of the target then radiates at least one emanating signal towards the SUT, where at least one emanating signal is radiated through the opening located on the side of the target and onto the SUT 530. Then, the method ends 535.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

As a further example, embodiments may involve a boresighting application that is a stand alone application, which may contain one or more programs, or that is part of another system or program.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for boresighting a system under test (SUT), the method comprising:
    radiating, by the SUT, at least one illuminating signal to a target, wherein the at least one illuminating signal is radiated onto an external screen of the target;
    detecting, by at least one external detector, the at least one illuminating signal radiated onto the external screen to produce an external detector measurement;
    aligning the SUT by using the external detector measurement;
    radiating, by the SUT, the at least one illuminating signal to the target, wherein the at least one illuminating signal is radiated through an opening located on a side of the target and onto an internal screen of the target;
    detecting, by at least one internal detector of the target, the at least one illuminating signal radiated onto the internal screen to produce an internal detector measurement; and
    aligning the SUT by using the internal detector measurement.

2. The method of claim 1, wherein the method further comprises:
   ceasing, by the SUT, the radiating of the at least one illuminating signal to the target;
   applying a signal source to the internal screen of the target;
   radiating, by an internal screen of the target, at least one emanating signal towards the SUT, wherein the at least one emanating signal is radiated through the opening located on the side of the target and onto the SUT;
   detecting, by at least one subsystem of the SUT, the at least one emanating signal to produce a SUT detector measurement; and
   aligning the at least one subsystem of the SUT by using the SUT detector measurement.

3. The method of claim 2, wherein the internal screen is one of an IR visualizer or a phosphor screen.

4. The method of claim 2, wherein the method further comprises measuring, by at least one temperature sensor, a temperature of the internal screen.

5. The method of claim 2, wherein the signal source is one of heating, with at least one heating unit, the internal screen; cooling, with at least one cooling unit, the internal screen; or illuminating, by an internal light source, the internal screen with light.

6. The method of claim 1, wherein the external screen is one of an infra-red (IR) visualizer or a phosphor screen.

7. The method of claim 1, wherein the at least one internal detector comprises at least one of a photodiode, a phototransistor, or a photocell.

8. The method of claim 7, wherein when the at least one internal detector comprises at least one photodiode, the at least one photodiode comprises at least one of silicon, ultra-violet (UV) enhanced silicon, InGaAs near infra-red (NIR), InGaAs far infra-red (FIR), or a combination thereof.

9. The method of claim 7, wherein when the at least one internal detector comprises at least one photodiode, the at least one photodiode comprises at least one bandpass filter.

10. The method of claim 1, wherein the SUT comprises at least one of a light emitting diode (LED), a laser, a hot filament, or a light-emitting device.

11. The method of claim 1, wherein the opening located on the side of the target is a pinhole.

12. The method of claim 1, wherein the target comprises a housing, and wherein the internal screen is located inside of the housing.

13. A system for a boresighting a system under test (SUT), the system comprising:
   the SUT to radiate at least one illuminating signal to a target, wherein the at least one illuminating signal is radiated onto an external screen of the target;
   at least one external detector to detect the at least one illuminating signal radiated onto the external screen to produce an external detector measurement;
   the SUT further to align by using the external detector measurement, and to radiate the at least one illuminating signal to the target, wherein the at least one illuminating signal is radiated through an opening located on a side of the target and onto an internal screen of the target;
   at least one internal detector of the target to detect the at least one illuminating signal radiated onto the internal screen to produce an internal detector measurement; and
   the SUT further to be aligned by using the internal detector measurement.

14. The system of claim 13, wherein the system further comprises:
   the SUT to cease the radiating of the at least one illuminating signal to the target;
   a signal source to be applied to the internal screen of the target;
   the internal screen of the target to radiate at least one emanating signal towards the SUT, wherein the at least one emanating signal is radiated through the opening located on the side of the target and onto the SUT; and
   at least one subsystem of the SUT to detect the at least one emanating signal to produce a SUT detector measurement, and to be aligned by using the SUT detector measurement.

15. The system of claim 14, wherein the internal screen is one of an IR visualizer or a phosphor screen.

16. The system of claim 14, wherein the system further comprises at least one temperature sensor to measure a temperature of the internal screen.

17. The system of claim 14, wherein the signal source is at least one heating unit to heat the internal screen, at least one cooling unit to cool the internal screen, or an internal light source to illuminate the internal screen with light.

18. The system of claim 13, wherein the external screen is one of an infra-red (IR) visualizer or a phosphor screen.

19. The system of claim 13, wherein the at least one internal detector comprises at least one of a photodiode, a phototransistor, or a photocell.

20. A method for an integrated optical boresighting target (IOBT), the method comprising:
   receiving, by the target, at least one illuminating signal radiated from a system under test (SUT), wherein the at least one illuminating signal is radiated onto an external screen of the target;
   receiving, by the target, the at least one illuminating signal radiated from the SUT, wherein the at least one illuminating signal is radiated through an opening located on a side of the target and onto an internal screen of the target;
   detecting, by at least one internal detector of the target, the at least one illuminating signal radiated onto the internal screen to produce an internal detector measurement;
   applying a signal source to the internal screen of the target; and
   radiating, by an internal screen of the target, at least one emanating signal towards the SUT, wherein the at least one emanating signal is radiated through the opening located on the side of the target and onto the SUT.

* * * * *